US006275613B1

(12) United States Patent
Aiger

(10) Patent No.: US 6,275,613 B1
(45) Date of Patent: Aug. 14, 2001

(54) METHOD FOR LOCATING A MODEL IN AN IMAGE

(75) Inventor: Dror Aiger, Tsuran (IL)

(73) Assignee: Medsim Ltd., Kfar Saba (IL)

( * ) Notice: Subject to any disclaimer, the term of this patent is extended or adjusted under 35 U.S.C. 154(b) by 0 days.

(21) Appl. No.: 09/324,516

(22) Filed: Jun. 3, 1999

(51) Int. Cl.$^7$ ............................... G06K 9/46; G06K 9/56; G06K 9/36

(52) U.S. Cl. ........................... 382/195; 382/205; 382/277

(58) Field of Search ..................................... 382/190, 195, 382/199, 200, 201, 205, 256, 277, 281, 295, 296, 298; 345/144, 470

(56) References Cited

U.S. PATENT DOCUMENTS

| | | | |
|---|---|---|---|
| 5,040,225 | 8/1991 | Gouge | 382/128 |
| 5,189,709 | 2/1993 | Wang et al. | 382/215 |
| 5,222,155 | 6/1993 | Delanoy et al. | 382/215 |
| 5,315,512 | 5/1994 | Roth | 600/442 |
| 5,319,551 | 6/1994 | Sekiguchi et al. | 382/131 |
| 5,351,310 | * 9/1994 | Califano et al. | 382/199 |
| 5,435,310 | 7/1995 | Sheehan et al. | 600/416 |
| 5,457,754 | 10/1995 | Han et al. | 382/128 |
| 5,559,901 | 9/1996 | Lobregt | 382/256 |
| 5,570,430 | 10/1996 | Sheehan et al. | 382/128 |
| 5,605,155 | 2/1997 | Chalana et al. | 600/442 |
| 5,640,200 | 6/1997 | Michael | 348/87 |
| 5,709,206 | 1/1998 | Teboul | 600/437 |
| 5,740,266 | 4/1998 | Weiss et al. | 382/128 |
| 5,776,063 | 7/1998 | Dittrich et al. | 600/408 |
| 5,779,638 | 7/1998 | Vesely et al. | 600/437 |
| 5,795,296 | 8/1998 | Pathak et al. | 600/443 |
| 5,828,769 | * 10/1998 | Burns | 382/118 |
| 6,108,444 | * 8/2000 | Syeda-Mahmood | 382/186 |
| 6,154,567 | * 11/2000 | McGarry | 382/219 |

OTHER PUBLICATIONS

Sig Roh et al, "3–D Object Recognition Using Projective Invariant Relationship by Single–View"; May 1998; IEEE Paper ISBN: 0–7803–4300–x–5, pp. 3394–3399.*
Lamdan et al, "Geometric Hashing: A General and Efficient Model–Based Recognition Scheme", Second Int'l. Conf. on Computer Vision, IEEE Computer Soc., 1988, pp. 238–249.
You et al, Efficient Image Matching: A Hierarchical Chamfer Matching Scheme Via Distributed System:, *Real Time Imaging*, 1: 245–259, 1995.
Moravec, H., "Towards Automatic Visual Obstacle Avoidance", 5th Int'l. Joint Conf. on Artific. Intel., p 584, 1977.
Borgefors, G., "Distance Transformations in Digital Images", *Computer Vision, Graphics and Image Processing*, 34: 344–371, 1986.

* cited by examiner

*Primary Examiner*—Amelia M. Au
*Assistant Examiner*—Mehrdad Dastouri
(74) *Attorney, Agent, or Firm*—Mark M. Friedman

(57) ABSTRACT

A method and system for recognizing an object in an image. A model of the sought object is transformed according to a set of preselected transformations to produce a set of transformed models, each transformed model including a plurality of transformed model pixels. A hash table is constructed, each entry of the hash table corresponding to an image pixel that in turn corresponds to a transformed model pixel of at least one of the transformed models, each entry of the hash table including a list of all the transformed models that include that transformed model pixel. The feature pixels of the image are determined, and are augmented by a distance transformation to provide a set of relevant pixels. Each relevant pixel that appears in the hash table contributes a score to the corresponding transformed models. For each transformed model, the sums of the scores provides a tally. The transformed model with the highest tally corresponds to the location of the object in the image if that highest tally exceeds a predetermined threshold.

14 Claims, 11 Drawing Sheets

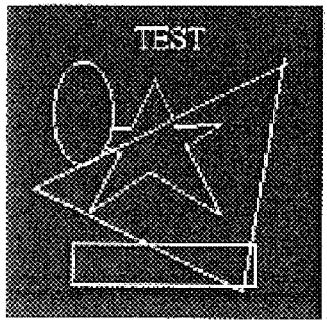
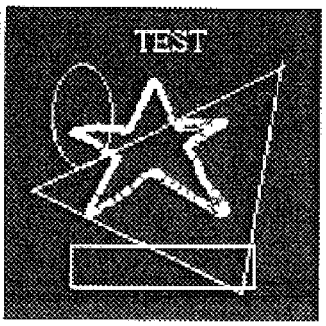
FIG. 19A   FIG. 19B
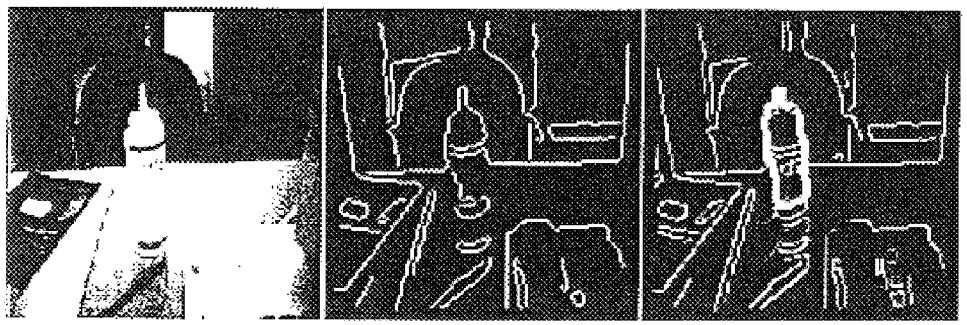
FIG. 20A   FIG. 20B   FIG. 20C

METHOD FOR LOCATING A MODEL IN AN IMAGE

FIELD AND BACKGROUND OF THE INVENTION

The present invention relates to model-based object recognition and, more particularly, to a method for object recognition based on transformation hashing and chamfer matching.

In applications such as automatic vision, it often is necessary to identify an object in a digital image of a scene. For example, a robot on an assembly line may need to identify a portion of a workpiece that the robot needs to work on. Typically, the image consists of a rectangular array of image pixels, each pixel having a certain gray level. In model-based object recognition, instead of working with the gray levels, feature pixels that correspond to corners and edges of objects in the scene are identified in the image, using conventional edge detection and corner detection algorithms. See, for example, J. Canny, "A computational approach to edge detection", *IEEE Transactions on Pattern Analysis and Machine Intelligence*, vol. PAMI-8 no. 6 pp. 679–698 (November 1986); H. Moravec, "Towards automatic visual obstacle avoidance", *5th International Joint Conference on Artificial Intelligence* p. 584 (1977); and R. M. Harelick and L. G. Shapiro, *Computer and Robot Vision* (Addison-Wesley, 1992), vol. 1 sec. 8.10 pp. 410–419, "Corner detection" and vol. 2 sec. 16.4 pp. 332–348, "An interest operator". The object whose presence is suspected in the image, or whose location in the image is sought, is represented as a model that includes several model points, called "feature points", that correspond to corners or edges of the sought object. A subset of the image feature pixels is sought that corresponds in some sense to the model feature points. If such a subset is found, that subset is presumed to be part of an outline of the sought object.

The prior art method of model-based object recognition that is closest to the present invention is that described in Yehezkel Lamdan and Haim J. Wolfson, "Geometric hashing: a general and efficient model-based recognition scheme", Second International Conference on Computer Vision, IEEE Computer Society, 1988, pp. 238–249. A better, more specific name for this prior art method is "basis set hashing". According to this method, the sought object is represented as a two-dimensional model consisting of a set of feature points. The method is most simply explained with reference to two-dimensional similarity transformations (rotations, translations and scaling). Pairs of feature points are considered in turn. For each pair of feature points, a coordinate system is formed in which one of the feature points of the pair has coordinates (0,0), and the other feature point of the pair has coordinates (1,0), so that the two points of the pair define one unit vector of a basis set of the coordinate system. The coordinates of the feature points collectively in this coordinate system constitute a representation of the model, specifically, the result of the similarity transformation of the feature point coordinates that transforms the first point of the pair to (0,0) and the second point of the pair to (1,0). Similar representations of the image are formed, using pairs of feature pixels.

The remainder of the method of Lamdan and Wolfson consists of looking for one or more image representations that include one of the model representations, to within the level of discretization represented by the pixels of the image. With m points in the model and n pixels in the set of feature pixels, if matching a model representation to an image representation has complexity t, then the complexity of brute force matching is $m^2 n^2 t$, which is of the order $n^5$ in the worst case. Therefore, Lamdan and Wolfson construct a hash table. Each entry of the hash table corresponds to an image pixel that includes one or more of the points of the model representations, and is a list of all the model representations having points that fall within that image pixel. Matching is done by assigning tallies to the model representations. All the tallies initially are 0. Pairs of feature points are selected as a potential base pair and all other feature points are transformed using this base. For each feature pixel with an entry in the hash table, 1 is added to the tally of each model representation listed in that entry. The model representation with the highest tally identifies the location of the object in the image. If no tallies exceed a predetermined threshold, then it is concluded that the object does not appear in the image. The fact that the hash table can be constructed in advance makes this method suitable, in principle, to real-time object recognition.

The above description of the prior art method of Lamdan and Wolfson is based on two-dimensional similarity transformations. The method also could be based on more complicated transformations, for example, on three-dimensional similarity transformations of three-dimensional models, or on affine transformations. The coordinate systems of the representations then are of higher dimensionality, for example, dimension 3 for three-dimensional similarity transformations and two-dimensional affine transformations. The run-time complexity for object recognition is $m^{k+1}$ for k-dimensional representation coordinate systems.

SUMMARY OF THE INVENTION

According to the present invention there is provided a method for locating a base model in an image including a plurality of image pixels, including the steps of: (a) transforming the base model to obtain a plurality of transformed models, each transformed model including a plurality of transformed model pixels; (b) tabulating, for each image pixel corresponding to one of the transformed model pixels, all the transformed models that include the one transformed model pixel; (c) identifying, from among the image pixels, a plurality of relevant pixels; (d) for each relevant pixel, assigning a score to each transformed model that is tabulated for the each relevant pixel; and (e) for each transformed model, summing the scores to obtain a tally.

According to the present invention there is provided a system for locating a base model in an image including a plurality of image pixels, including: (a) a software module including a plurality of instructions for: (i) transforming the base model to obtain a plurality of transformed models, each transformed model including a plurality of transformed model pixels, (ii) tabulating, for each image pixel corresponding to one of the transformed model pixels, all the transformed models that include the one transformed model pixel, (iii) identifying, from among the image pixels, a plurality of relevant pixels, (iv) for each relevant pixel, assigning a score to each transformed model that is tabulated for each relevant pixel, and (v) for each transformed model, summing the scores to obtain a tally; (b) a processor for executing the instructions; and (c) a memory for storing the base model, the image and the transformed models.

The method of the present invention is similar to the method of Lamdan and Wolfson, with two important differences.

The first difference is that instead of making a hash table of model representations, the method of the present invention makes a hash table of transformed models. A set of transformed models is constructed, and discretized, in accordance with the image discretization, to provide, for each transformed model, a set of transformed model pixels. Each entry of the hash table corresponds to an image pixel that coincides with a transformed model pixel of at least one transformed model, along with a list of all the transformed models in which that pixel appears as a transformed model pixel. Because of this difference, object recognition is effected without transforming the image pixels at run time. The complexity of run-time object recognition, according to the present invention, is of order m, rather than the order $m^{k+1}$ complexity of the prior art method. To distinguish the original model from the transformed models, the original model is referred to herein as the "base model".

The second difference is that chamfer matching (H. G. Barrow, J. M. Tenenbaum, R. C. Boles and H. C. Wolf, "Parametric correspondence and chamfer matching: two new techniques for image matching", *Proc. 5th Int. Joint Conf. Artificial Intelligence*, Cambridge Mass., 1977, pp. 659–663) is used to match feature pixels to hash table entries. The set of feature pixels is expanded to form a set of "relevant" pixels that includes both the feature pixels and pixels within a certain maximum distance from the feature pixels. The scores that are added to the tallies of the transformed models are decreasing functions of the distances between the image (relevant) pixels corresponding to the transformed model pixels and the nearest feature pixels.

BRIEF DESCRIPTION OF THE DRAWINGS

The invention is herein described, by way of example only, with reference to the accompanying drawings, wherein:

FIG. 13 is FIG. 12 with the feature pixels of the sought object labeled;

FIG. 14 is a distance transformation of the image of FIG. 11;

FIG. 19 shows a synthetic image in which a star is located by the method of the present invention;

FIG. 20 shows an image, of a real scene, in which a bottle is located by the method of the present invention;

DESCRIPTION OF THE PREFERRED EMBODIMENTS

The present invention is of a method of locating a model in an image, and of a system for implementing the method. Specifically, the present invention can be used for real-time model-based object recognition.

The principles and operation of object-based model recognition according to the present invention may be better understood with reference to the drawings and the accompanying description.

For illustrational simplicity, the present invention is illustrated herein with reference to an image of 289 (17×17) pixels, and with reference to a restricted set of transformations: translations and scaling. In practice, the preferred set of transformations is more general. At the very least, rotations are included, to provide a full set of similarity transformations. More generally, affine transformations, of which similarity transformations are a special case, are used. In addition, the images typically are at least 128×128 (16,384 pixels).

Figure 2:
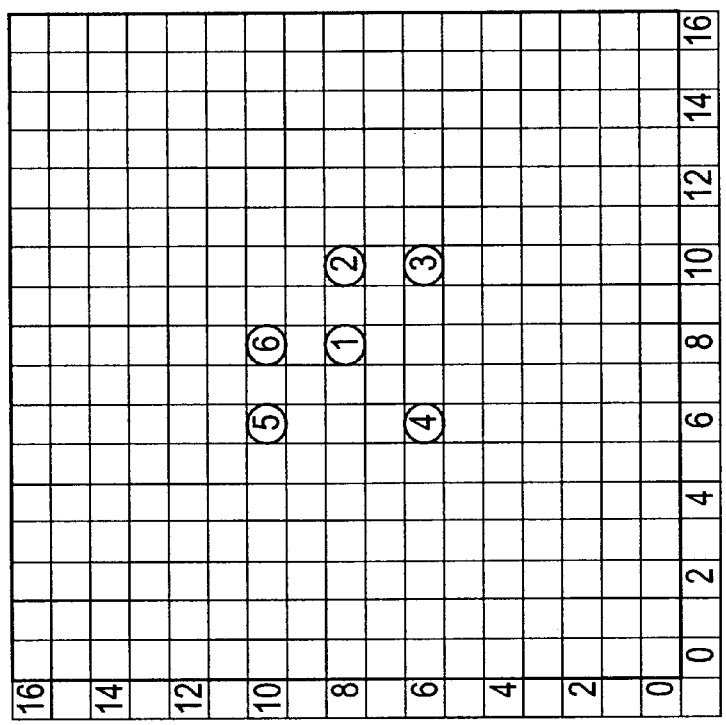
FIG. 2 shows the feature pixels of the model.
Figure 1:
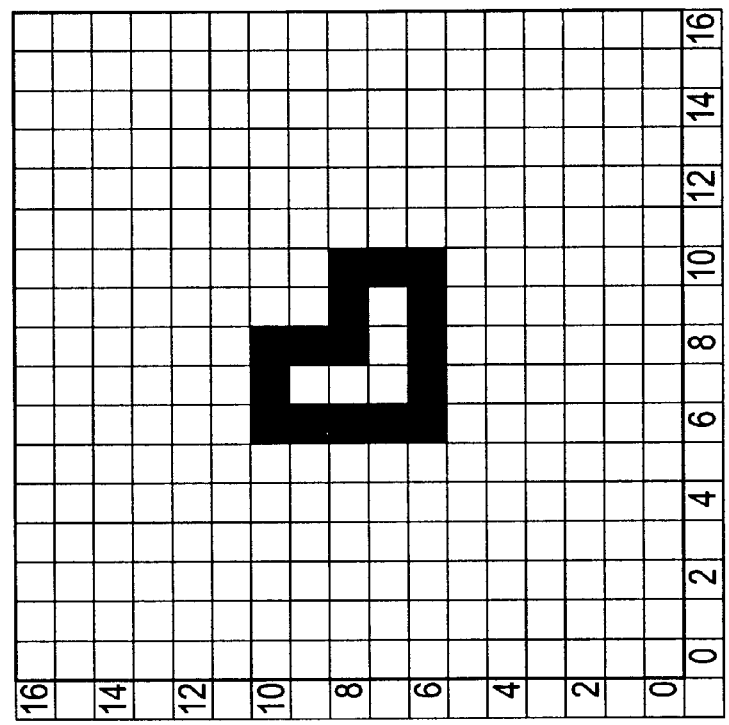
FIG. 1 shows a model of an object to be sought in an image.
Figure 12:
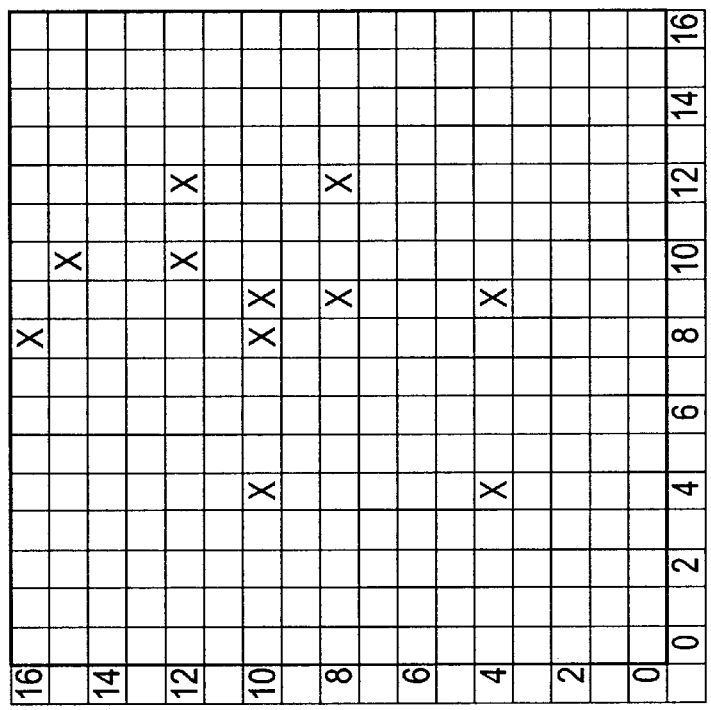
FIG. 12 shows the feature pixels of the image of FIG. 11.
Figure 11:
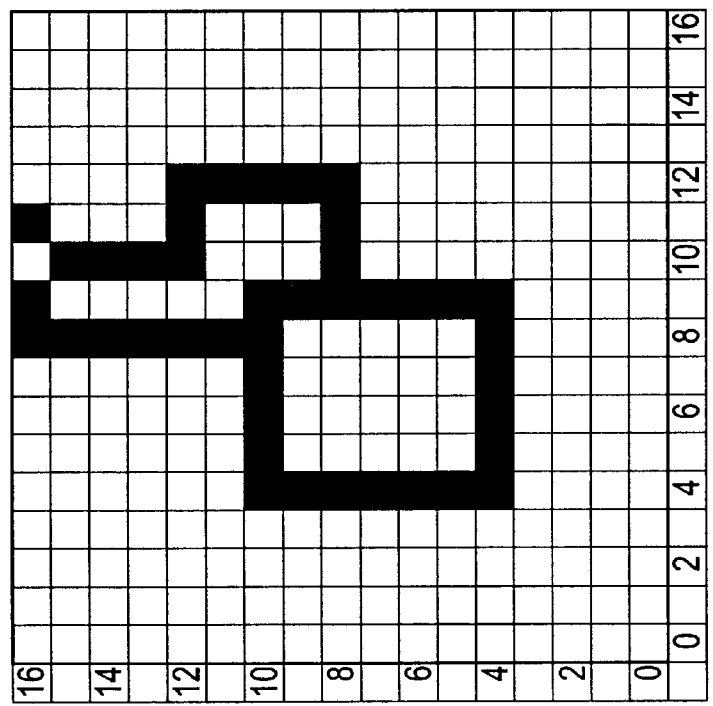
FIG. 11 is the image in which the object modeled in FIG. 1 is to be located.
Figure 16:
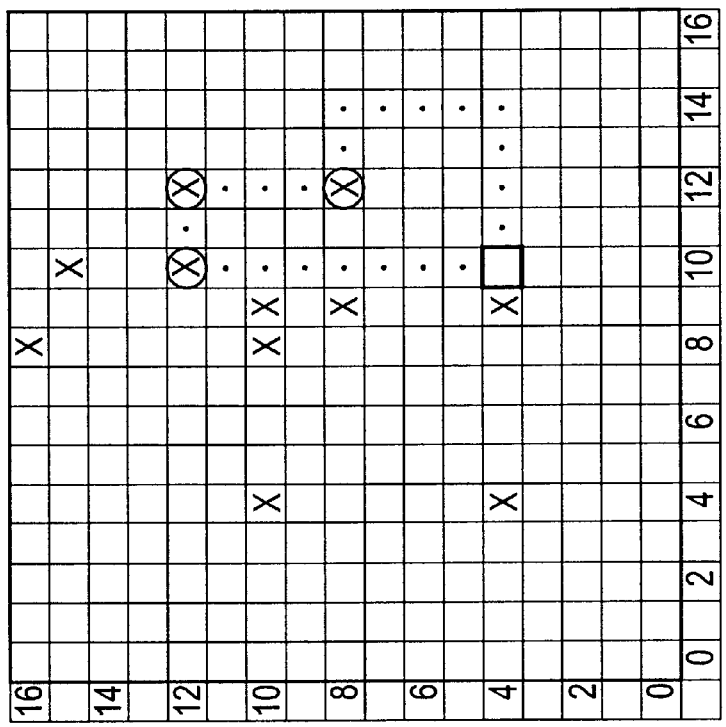
FIG. 16 shows transformed model T1253 relative to the feature pixels of FIG. 12.
Figure 15:
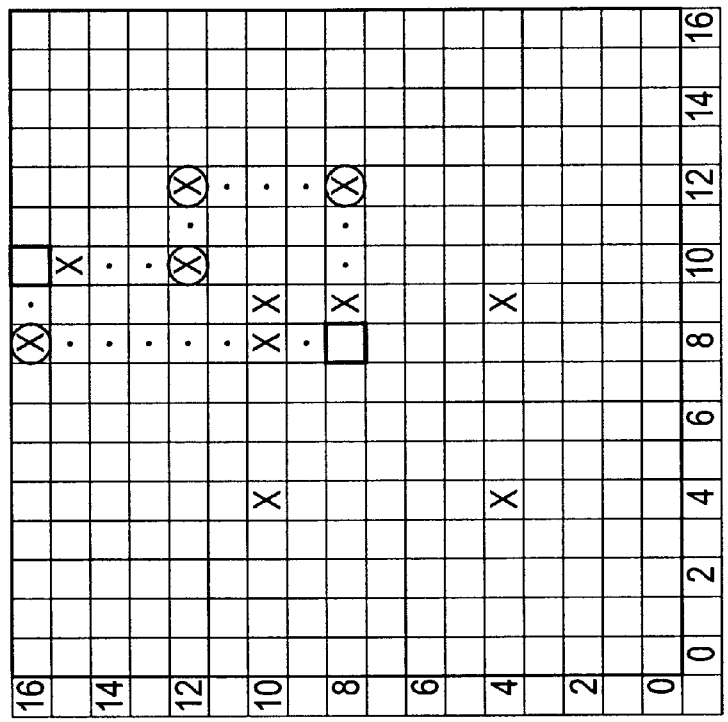
FIG. 15 shows transformed model T1245 relative to the feature pixels of FIG. 12.

Referring now to the drawings, FIG. 11 shows an image, of 289 pixels, in which an object is to be located. FIG. 1 shows the base model of the object. In FIG. 12, the feature pixels of the image, obtained by edge and corner extraction, are marked by X's. In FIG. 2, the six corners of the model, which are the feature points of the model, and which were obtained similarly by edge and corner extraction in a preprocesing step, are marked by numbered circles.

Figure 4:
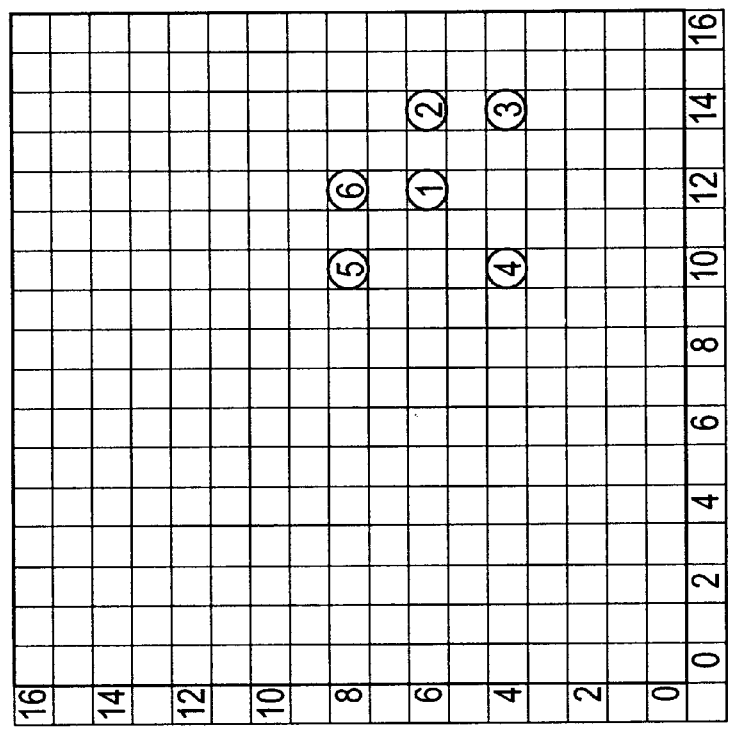
FIG. 4 shows transformed model T1152.
Figure 3:
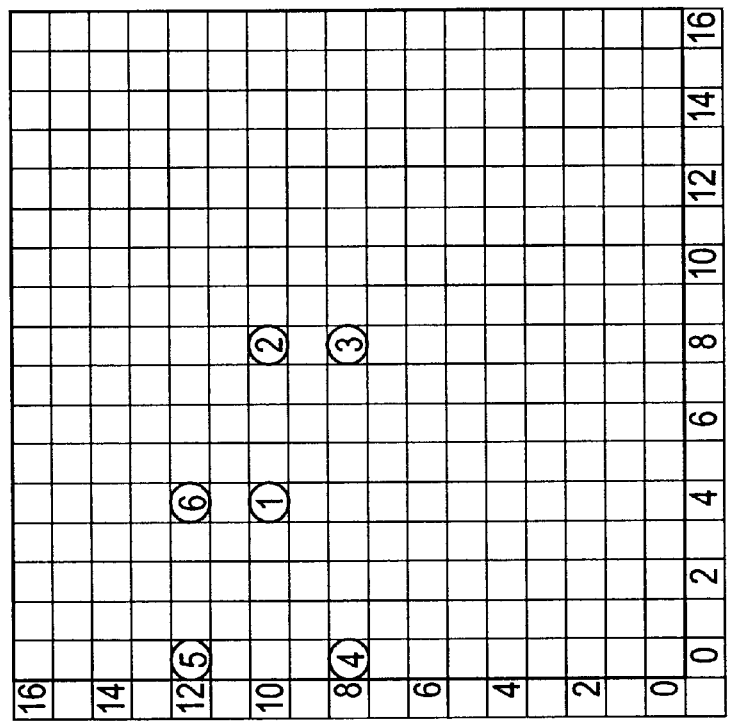
FIG. 3 shows transformed model T2114.
Figure 6:
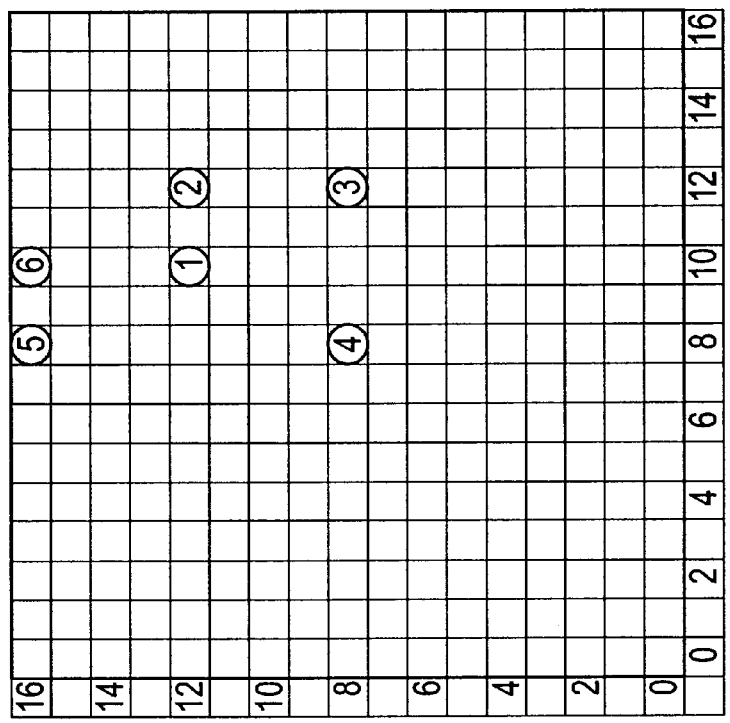
FIG. 6 shows transformed model T1245.
Figure 5:
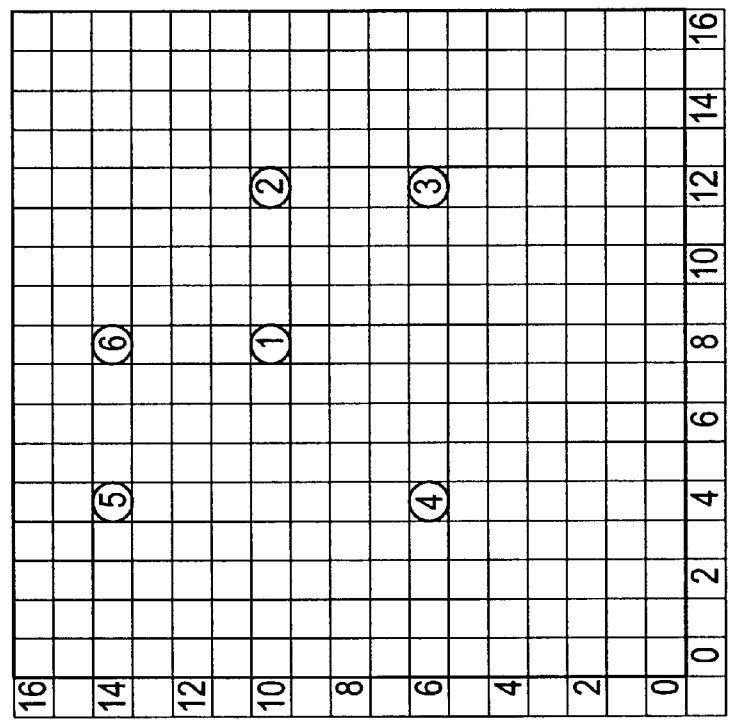
FIG. 5 shows transformed model T2234.

The set of transformations in this illustrative example is the composition of one of two x-scalings, one of two y-scalings, one of five x-translations and one of five y-translations, for a total of 2×2×5×5=100 composite transformations. The x-scalings are by a factor of 1 (no change) and by a factor of 2 (double in width). The y-scalings are by a factor of 1 (no change) and by a factor of 2 (double in height). The x-translations are by −4, −2, 0, 2 and 4 pixels. The y-translations are by −4, −2, 0, 2 and 4 pixels. The composite transformations are labeled as "Tabcd", where a is the index of the x-scaling, b is the index of the y-scaling, c is the index of the x-translation and d is the index of the y-translation. Equivalently, the transformed models are labeled by the corresponding transformation labels. The pixels to which the corners of the model are mapped by the transformations are the transformed model pixels. The numbered pixels of FIG. 2 are the transformed model pixels for the identity transformation T1133, or equivalently for transformed model T1133. In FIG. 3, the transformed model pixels of transformed model T2114 are marked by numbered circles, with the numbers corresponding to the numbered corners of FIG. 2. For example, transformation T2114 maps the pixel labeled 5 in FIG. 2 into the pixel labeled 5 in FIG. 3. Similarly, FIG. 4 shows transformed model T1152, FIG. 5 shows transformed model T2234 and FIG. 6 shows transformed model T1245. Note that the scalings must map one pixel into itself. In this illustrative example, the pixel that is mapped into itself by the scalings is pixel (8,8), where corner 1 of the model is located.

Figure 8:
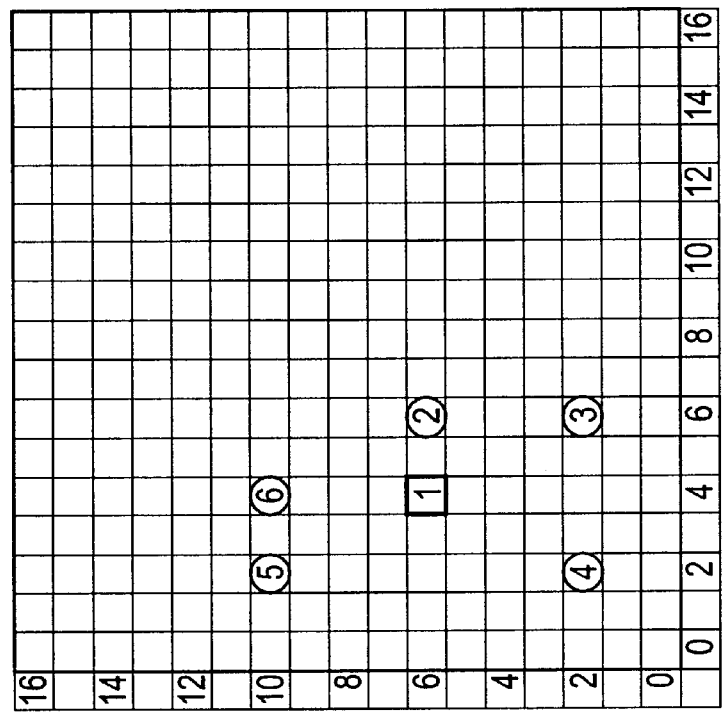
FIG. 8 shows image pixel (4,6) in transformed model T1212.
Figure 7:
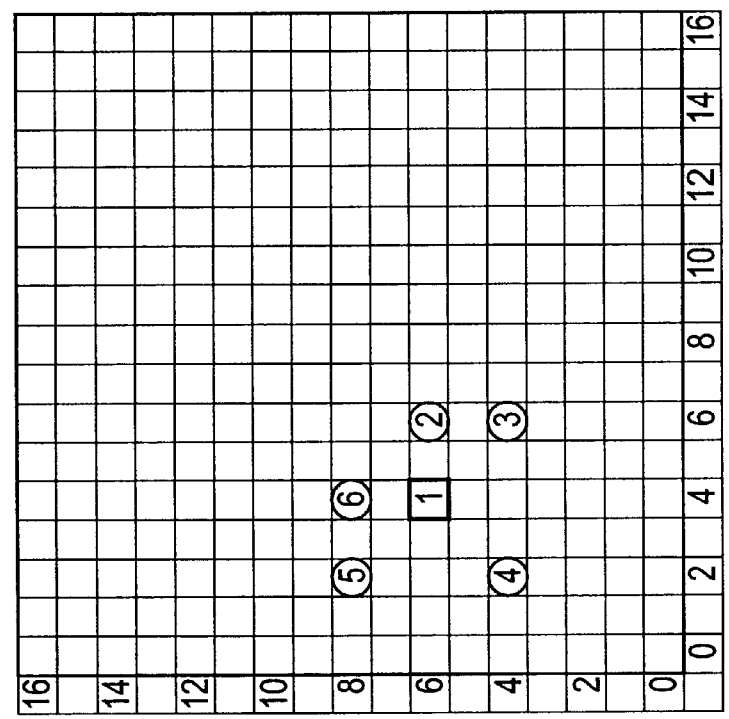
FIG. 7 shows image pixel (4,6) in transformed model T1112.
Figure 10:
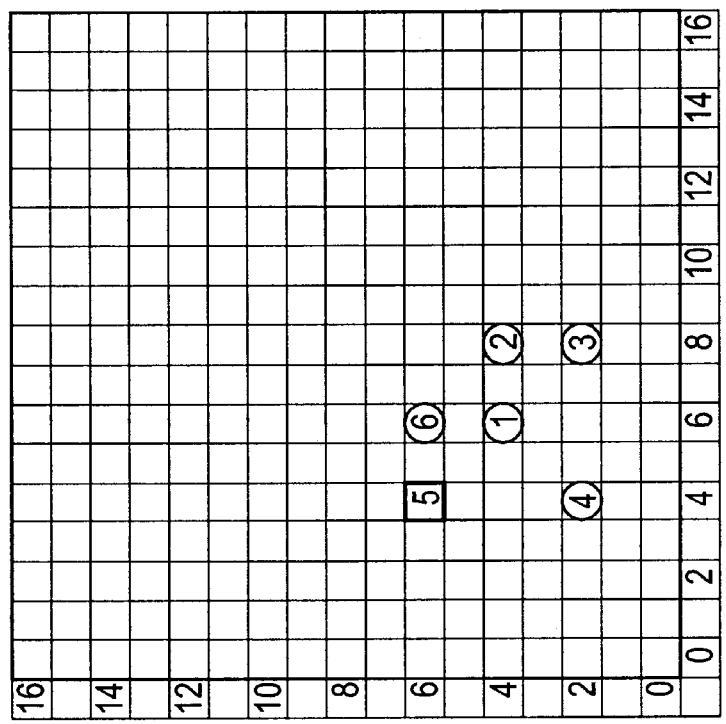
FIG. 10 shows image pixel (4,6) in transformed model T1121.
Figure 9:
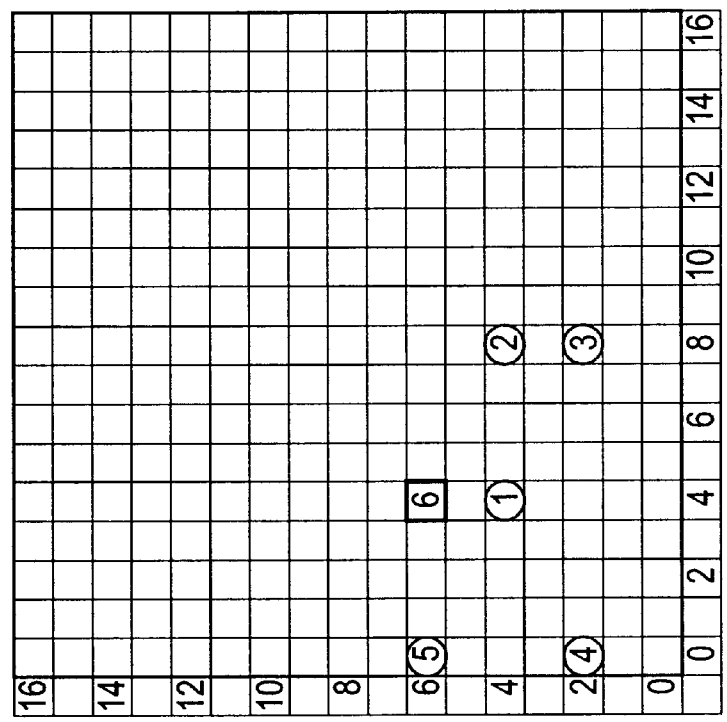
FIG. 9 shows image pixel (4,6) in transformed model T2111.

The hash table has one entry for each image pixel that is coincident with a transformed model pixel of at least one transformed model. The entries of the hash table are labeled by the corresponding image pixel coordinates. For example, image pixel (4,6) coincides with transformed model pixel 1 of transformed model T1112 (FIG. 7), with transformed model pixel 1 of transformed model T1212 (FIG. 8), with transformed model pixel 6 of transformed model T2111 (FIG. 9) and with transformed model pixel 5 of transformed model T1121 (FIG. 10). Eight other transformed models (T2112, T2212, T1123, T1224, T2113, T2234, T2131 and T1111) also include pixels that coincide with image pixel (4,6). Therefore, entry (4,6) of the hash table is the list (T1112, T1212, T2111, T1121, T2112, T2212, T1123, T1224, T2113, T2234, T2131, T1111).

Figures 13, 14:
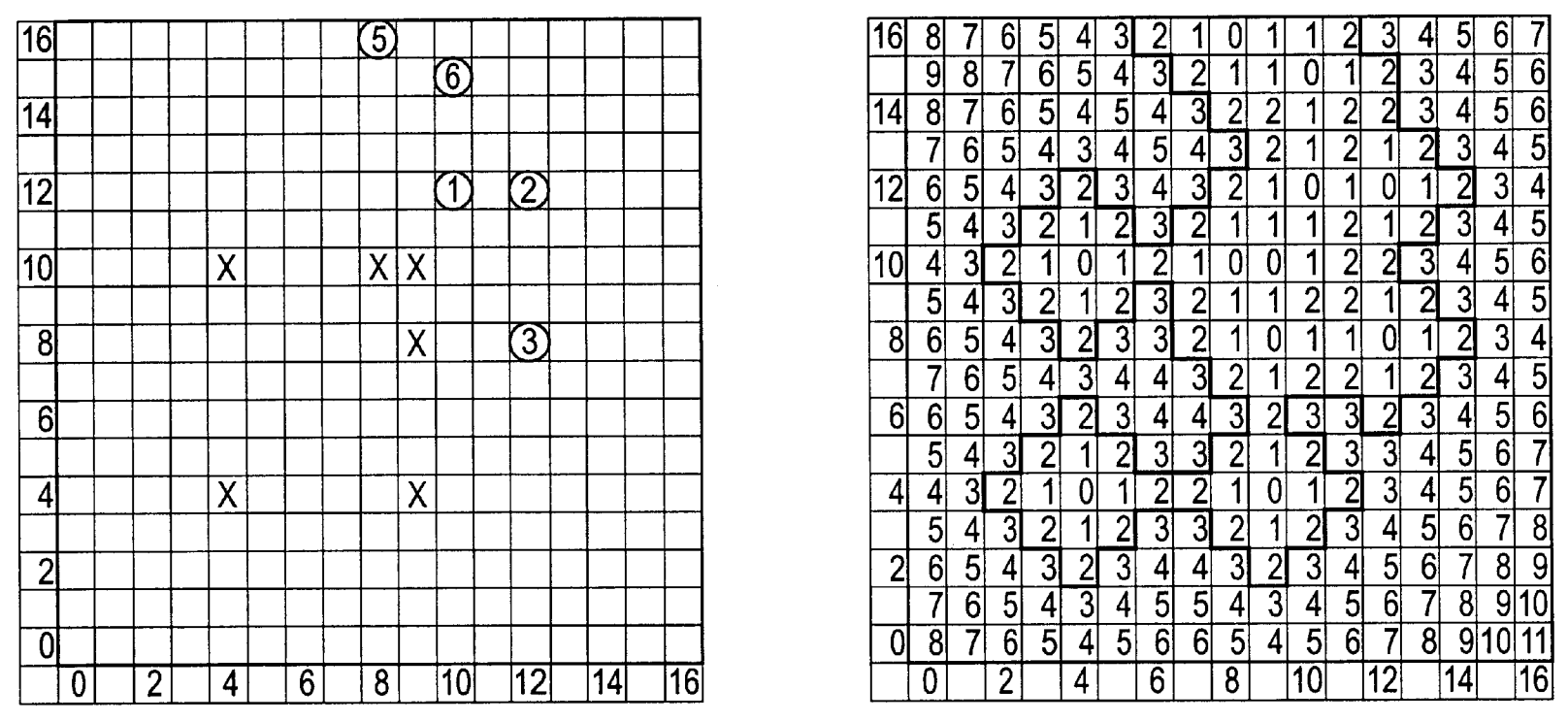

FIG. 13 duplicates FIG. 12, but the model corners that actually appear in the image of FIG. 11 are labeled with corresponding circled numbers. Note that corner 4 does not appear because corner 4 is occluded in the image of FIG. 11. Also note that corner 6 is not exactly in its correct location. This deviation of corner 6 from its correct location simulates an error introduced by imperfect image acquisition.

The first step in the matching of the transformed models, listed in the hash table, to the feature points is the construction of a distance transform of the image (Gunilla Borgefors, "Distance transformations in digital images", *Computer Vision, Graphics and Image Processing*, vol. 34 (1986) pp. 344–371), which is incorporated by reference for all purposes as if fully set forth herein. A distance transformation is an assignment, to each image pixel of the image of FIG. 11, of a distance from that image pixel to the nearest feature pixel. This distance need not be a Euclidean distance. In fact, it is preferable not to use Euclidean distance, to avoid the computational burden of square roots. FIG. 14 shows a distance transformation that uses, for the distance between a pixel $(x_i, y_i)$ and a pixel $(x_j, y_j)$, the "city block" distance transformation, $|x_i - x_j| + |y_i - y_j|$. This distance transformation is used here only for illustrational purposes. As noted by Borgefors, the preferred distance transformation, which is a much closer approximation to the Euclidean distance than the city block distance transformation, is the "chamfer 3–4" distance transformation. The feature pixels themselves are assigned a distance of 0. The feature pixels, together with the image pixels out to some maximum distance C, constitute a set of "relevant" pixels. The set of relevant pixels in FIG. 14, based on C=2, is outlined. This relatively low value of C is used here only for illustrational purposes. In practice, the preferred range of C is between 10 and 15.

Figure 18:
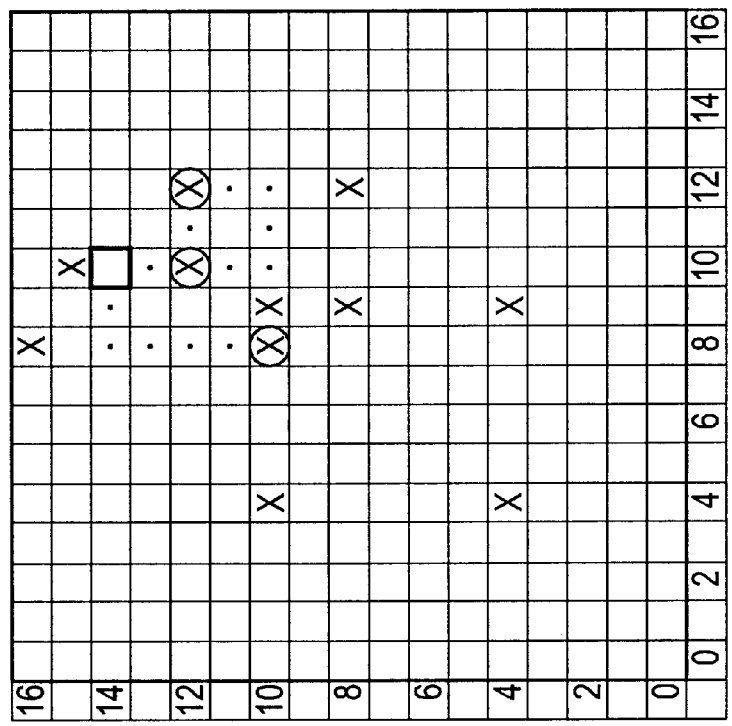
FIG. 18 shows transformed model T1145 relative to the feature pixels of FIG. 12.
Figure 17:
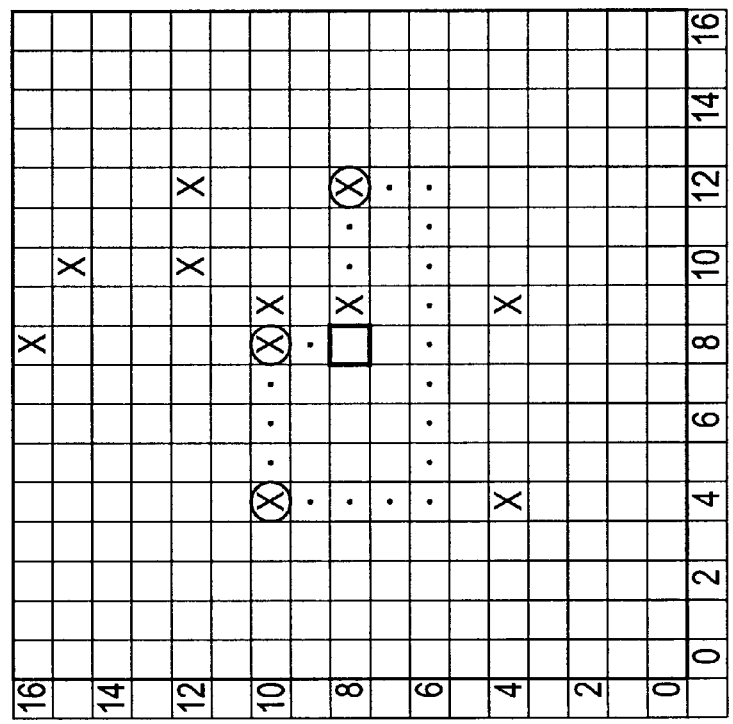
FIG. 17 shows transformed model T2133 relative to the feature pixels of FIG. 12.

The second step in matching the transformed models to the feature pixels is computing a tally for each transformed model. The tallies are initialized to 0. Then each relevant pixel is examined in turn. For each relevant pixel that has an entry in the hash table, a score, that is a decreasing function of the distance assigned to that relevant pixel in the distance transformation, is added to the tally of each transformed model that is listed in that hash table entry. The simplest such decreasing function is C–D, where C is the maximum distance used to define the set of relevant pixels and D is the distance assigned to the relevant pixel under consideration. FIGS. 15–18 show the four transformed models with the highest tallies when C=2: T1245 (FIG. 15, tally=10), T1253 (FIG. 16, tally=7), T2133 (FIG. 17, tally=7) and T1145 (FIG. 18, tally=7). In FIGS. 15–18, feature pixels are marked with X's, the outlines of the transformed models are indicated by dotted lines, transformed model pixels that coincide with feature pixels are marked with circles, and transformed model pixels that are a unit distance from feature pixels are marked with squares. Only the transformed model pixels thus marked contribute to the tallies: each transformed model pixel marked with a circle contributes a score of 2 and each transformed model pixel marked with a square contributes a score of 1. Transformation T1245, with the highest tally, comes closest to identifying and locating the model in the image of FIG. 11.

If none of the tallies exceed a predetermined threshold, it is presumed that the model is absent from the image. Those skilled in the art will be able to devise reasonable thresholds. For example, for the image of FIG. 11, and for the model of FIGS. 1 and 2 that has 6 feature points, assuming that at least 80% of the feature points of the model appear within the image without being truncated or occluded and fall within one pixel of the location predicted by the model transformations, a reasonable estimated threshold is 6×1× 0.8=4.8≈5. All four transformations of FIGS. 15–19 have tallies that exceed this threshold. For a model with 10 feature points, a maximum distance of 15, and assuming that at least 80% of the feature points appear within the image and fall within two pixels of the location predicted by the model transformations, a reasonable estimated threshold is 10× (15–2)×0.8=104.

FIG. 19A is an image of a synthetic scene including an oval, a triangle, a star and a rectangle. The image of FIG. 19A includes 16384 (128×128) pixels. The object sought is the star. The method of the present invention was used to find the star, using a model of the star and the following transformation space:

Rotation: –20 degrees to +20 degrees in steps of 2 degrees
X-scaling: 0.2 to 2.0 in steps of 0.1
Y-scaling: 0.2 to 2.0 in steps of 0.1
X-translation: –64 pixels to +64 pixels in steps of 4 pixels
Y-translation: –64 pixels to +64 pixels in steps of 4 pixels for a total of 21×19×19×33×33=8,255,709 similarity transformations. FIG. 19B shows the outline of the star as determined by the method of the present invention. FIG. 20A is a 128×128 image of a real-world scene, including several objects. The object sought is the bottle. FIG. 20B shows the set of feature pixels determined by edge detection. FIG. 20C shows the outline of the bottle as determined by the present invention, using the above-defined 8,255,709 similarity transformations.

Figure 21:
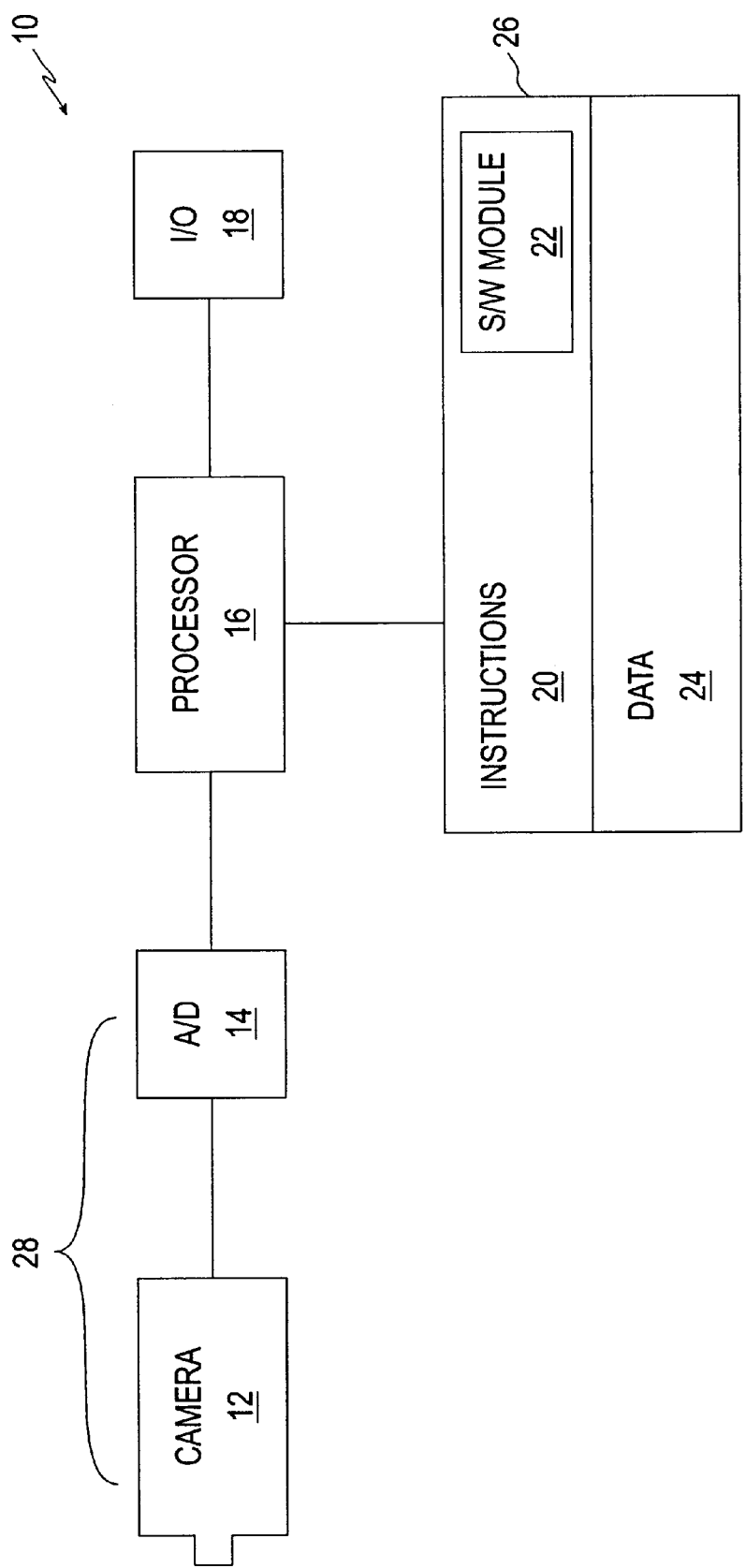
FIG. 21 is a high level block diagram of a system of the present invention.

FIG. 21 is a high level block diagram of a system 10 for real time model-based object recognition according to the present invention. System 10 includes a processor 16, a random access memory 26, a real time input interface 28 including a video camera 12 and an analog-to-digital converter 14, and a set of conventional input/output devices, such as a keyboard, a modem, a floppy disk drive, a printer and a video monitor, represented by I/O block 18. Camera 12 typically is based on a two dimensional charge-coupled-detector array. Memory 26 includes an instruction storage area 20 and a data storage area 24. Within instruction storage area 20 is a software module 22 including a set of instructions which, when executed by processor 16, enable processor 16 to perform model-based object recognition according to the method of the present invention.

Using the appropriate input device 18 (typically a floppy disk drive), source code of software module 22, in a suitable high level language, for model-based object recognition as taught herein, is loaded into instruction storage area 20. Selecting a suitable language for the instructions of software module 22 is easily done by one ordinarily skilled in the art. The language selected should be compatible with the hardware of system 10, including processor 16, and with the operating system of system 10. Examples of suitable languages include but are not limited to compiled languages such as FORTRAN, C and C++. If a compiled language is selected, a suitable compiler is loaded into instruction storage area 20. Following the instructions of the compiler, processor 16 converts the source code into machine-language instructions, which also are stored in instruction storage area 20 and which also constitute a portion of software module 22. Other needed software routines and packages, for example software for feature extraction (e.g., edge detection), are loaded and compiled similarly. Using the appropriate input device 18, the model of the sought object and the transformation space parameters are entered, and are stored in data storage area 24. Following the instructions in software module 22, processor 16 constructs the hash table. Now, whenever input interface 28 acquires a digital image of a scene, by registering the image using camera 12 and digitizing the signals from camera 12 using analog-to-digital converter 14, processor 16 follows the instructions stored in software module 22 to locate the sought object in the acquired digital image as taught herein.

While the invention has been described with respect to a limited number of embodiments, it will be appreciated that many variations, modifications and other applications of the invention may be made.

What is claimed is:

1. A method for locating a base model in an image including a plurality of image pixels, comprising the steps of:
   (a) transforming the base model to obtain a plurality of transformed models, each said transformed model including a plurality of transformed model pixels;
   (b) tabulating, for each image pixel corresponding to one of said transformed model pixels, all said transformed models that include said one transformed model pixel;
   (c) identifying, from among the image pixels, a plurality of relevant pixels;
   (d) for each said relevant pixel, assigning a score to each said transformed model that is tabulated for said each relevant pixel; and
   (e) for each said transformed model, summing said scores to obtain a tally.

2. The method of claim 1, further comprising the step of:
   (f) comparing said tallies to a threshold; the base model then being presumed present in the image only if at least one said tally exceeds said threshold.

3. The method of claim 2, further comprising the step of:
   (g) identifying a location of the base model with one of said transformed models having a largest said tally.

4. The method of claim 1, wherein said plurality of relevant pixels includes a plurality of feature pixels.

5. The method of claim 4, wherein each image pixel is at a certain distance from said plurality of feature pixels, and wherein said plurality of relevant pixels includes only said image pixels for which said distance is at most a certain maximum distance.

6. The method of claim 5, wherein said score is a decreasing function of said distance.

7. The method of claim 6, wherein said decreasing function is a difference between said maximum distance and said distance.

8. The method of claim 1, wherein each said transformed model is a different transformation of the base model.

9. The method of claim 8, wherein said transformations include translations, scalings, and combinations thereof.

10. The method of claim 8, wherein said transformations include translations, scalings, rotations, and combinations thereof.

11. The method of claim 8, wherein said transformations include affine transformations.

12. The method of claim 1, wherein said tabulating produces a hash table, each entry of said hash table corresponding to one of said image pixels that corresponds to one of said transformed pixels.

13. A system for locating a base model in an image including a plurality of image pixels, comprising:
   (a) a software module including a plurality of instructions for:
      (i) transforming the base model to obtain a plurality of transformed models, each said transformed model including a plurality of transformed model pixels,
      (ii) tabulating, for each image pixel corresponding to one of said transformed model pixels, all said transformed models that include said one transformed model pixel,
      (iii) identifying, from among the image pixels, a plurality of relevant pixels,
      (iv) for each said relevant pixel, assigning a score to each said transformed model that is tabulated for each said relevant pixel, and
      (v) for each said transformed model, summing said scores to obtain a tally;
   (b) a processor for executing said instructions; and
   (c) a memory for storing the base model, the image and the transformed models.

14. The system of claim 13, wherein said tabulating produces a hash table that is stored in said memory, each entry of said hash table corresponding to one of said image pixels that corresponds to one of said transformed model pixels.

* * * * *